Dec. 19, 1967  A. M. SCHERER  3,358,585
GRILL ASSEMBLY
Filed Feb. 1, 1966  3 Sheets-Sheet 1
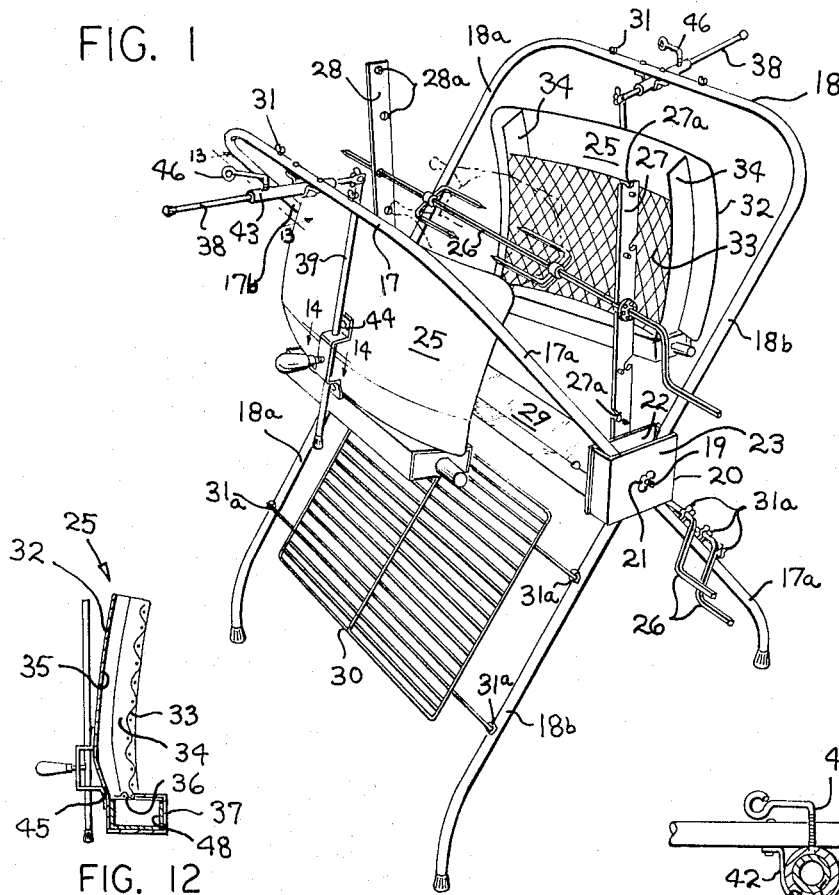
FIG. 1
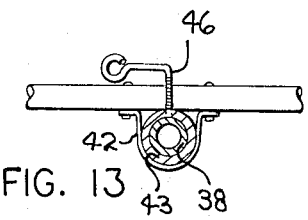
FIG. 13
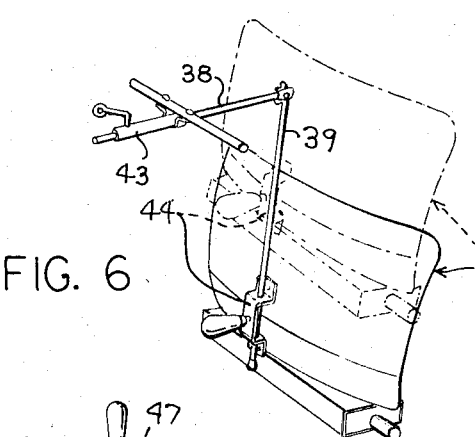
FIG. 12
FIG. 6
FIG. 14
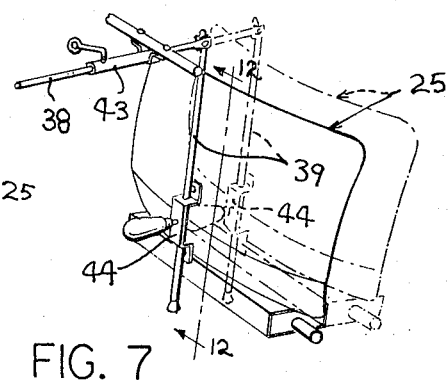
FIG. 7
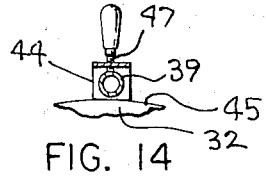
INVENTOR.
ARNOLD M. SCHERER
BY Pence & Stutz
ATTORNEYS Dec. 19, 1967   A. M. SCHERER   3,358,585
GRILL ASSEMBLY Filed Feb. 1, 1966   3 Sheets-Sheet 2

INVENTOR.
ARNOLD M. SCHERER
BY *Pence & Stutz*
ATTORNEYS

Dec. 19, 1967  A. M. SCHERER  3,358,585
GRILL ASSEMBLY

Filed Feb. 1, 1966  3 Sheets-Sheet 3

INVENTOR.
ARNOLD M. SCHERER

BY Pence & Stutz

ATTORNEYS

United States Patent Office 3,358,585
Patented Dec. 19, 1967

3,358,585
GRILL ASSEMBLY
Arnold M. Scherer, 8660 Crabb Road,
Temperance, Mich. 48182
Filed Feb. 1, 1966, Ser. No. 524,327
26 Claims. (Cl. 99—340)

ABSTRACT OF THE DISCLOSURE

A collapsible and portable grill assembly for barbecuing, grilling and cooking various items of food which is especially suitable for outdoor use, having pivotal support members which may be pivotably deployed between oppositely disposed upstanding and collapsed relative positions. Among other particularly salient features, the grill assembly defines a centrally located heating and cooking region along side of which at least one heat producing chamber is carried and provided with various intercooperative adjustment means affording selective intercooperative pivotal, rotational, horizontal and vertical positioning movements of the heating unit so that the heating unit may be extensively rearranged and reoriented relative to the heating and cooking region of the grill. In other salient aspects, the grill assembly is constructed to accommodate either simultaneous or separate grilling and spit roasting by means of a horizontally disposable grill and vertically disposable spits located beneath the grill. Further, the grill assembly is designed to accommodate a drip pan for uncontaminated retrieval of juices and drippings and to accommodate a removable ash drawer which permits disposal of ashes and other combustion products even during such times as the grill assembly is being employed for cooking purposes.

Figure 4:
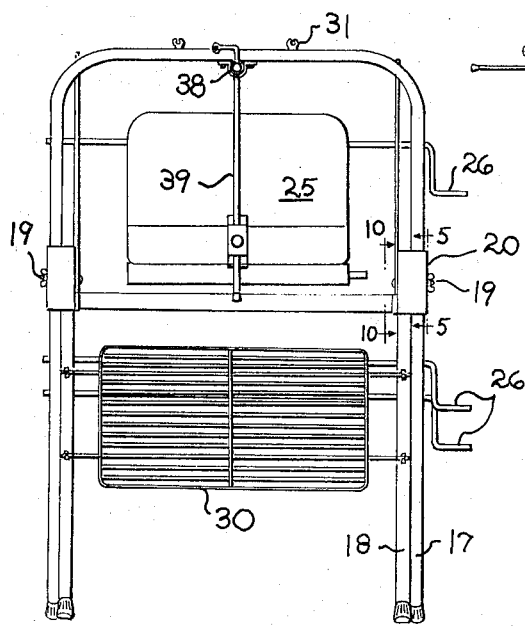

The present invention relates generally to a grill assembly having an improved design and construction which imparts extreme versatility in the manner of use of the grill assembly for barbecuing, grilling and cooking various items of food. In other more particular aspects, the grill assembly is particularly adapted to be portable and especially well-suited for outdoor use in that it may be alternatively collapsed or erected without necessitating dismantling of the grill.

Among others, one salient feature of the grill assembly is the manner in which the heat producing chambers or fuel chambers may be extensively rearranged and repositioned in relation to the food which is to be prepared on the grill.

Another principal objective of the present invention is the provision of a grill assembly which, in addition to possessing the foregoing characteristics, is capable of being readily transported from one location to another, according to the needs or desires of the user.

Another objective of the present invention is the provision of an outdoor grill of the foregoing type which is further characterized by being capable of being quickly converted between a stable erected position and a collapsed or folded position; the latter position being such as to facilitate storage of the grill when it is not in use or to facilitate the transport thereof from one location to another.

Another objective of the present invention is the provision of an outdoor grill having at least one heating unit, or fuel-containing combustion chamber, which is capable of being extensively rearranged to thereby accommodate extensive repositioning and reorientation of the heating unit relative to items of food being cooked or prepared on the grill.

In accordance with the foregoing and other additional aspects, one principal objective of the present invention is the provision of a grill assembly having a high degree of versatility in manner of use and which is designed to promote improved culinary achievement in use of the grill assembly for most any type of outdoor cooking purposes ordinarily desired.

Another objective of the present invention is to provide a grill assembly wherein the heating unit may be so situated as to avoid contact thereof with grease or juices dripping from the food during cooking.

Another objective of the present invention is the provision of means whereby ashes and other particulate combustion products may be conveniently removed from the grill and emptied either during or after use of the grill.

Another objective of the present invention is to provide a grill assembly structurally adapted to accommodate reflective means capable of implementing the efficiency and overall heating and cooking effectiveness of the grill.

Another objective of the present invention is the provision of an outdoor grill assembly including means by which juices and drippings emanating from the cooking food may be retrieved for reuse, such as for the preparation of gravy, or the like.

Another objective of the present invention is the provision of a grill in which several items of food may be accommodated in vertically aligned spits and simultaneously cooked.

A still further and particularly significant objective of the present invention is the provision of a grill assembly having one or more heating units suspended by various inter-cooperative adjustment means accommodating selective pivotal, rotational, horizontal and vertical positioning movements of the heating units.

Figure 2:
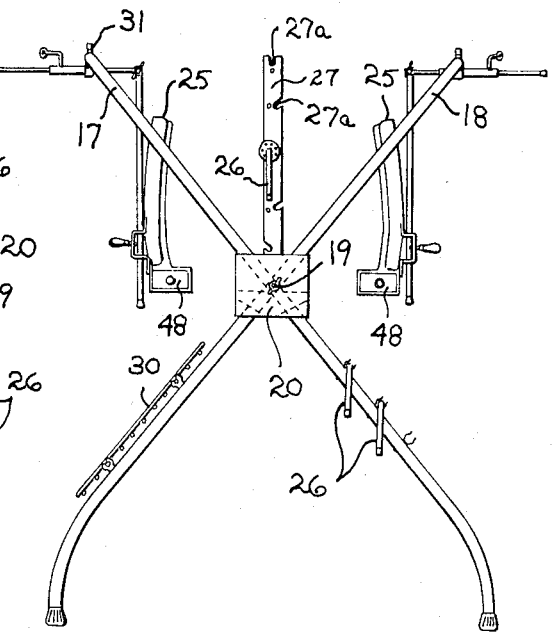
Figure 10:
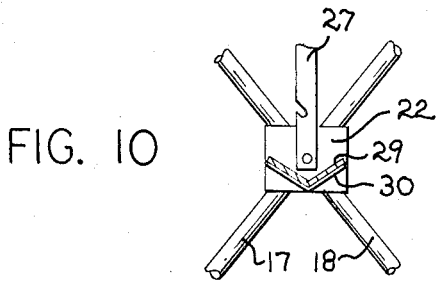
Figure 5:
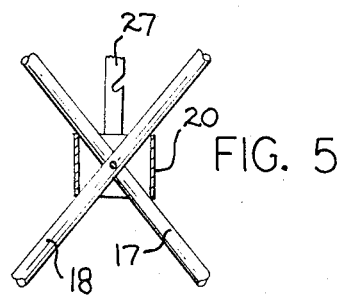
Figure 11:
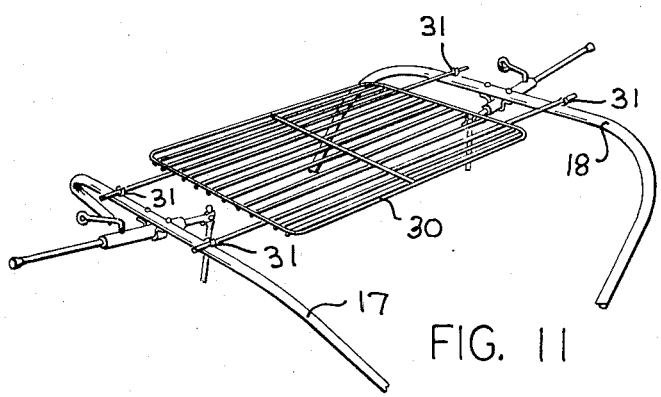
Figure 3:
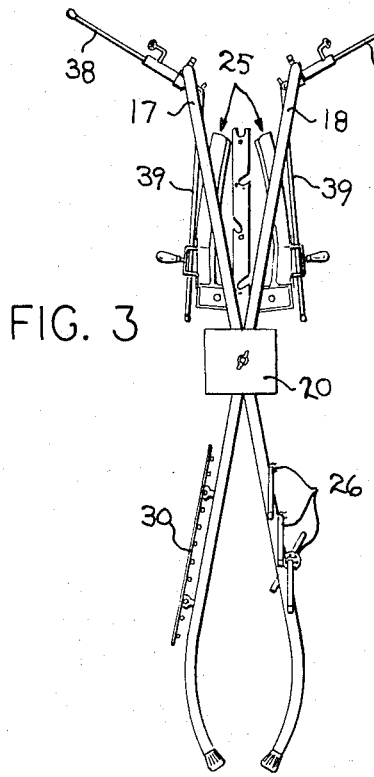
Figure 15:
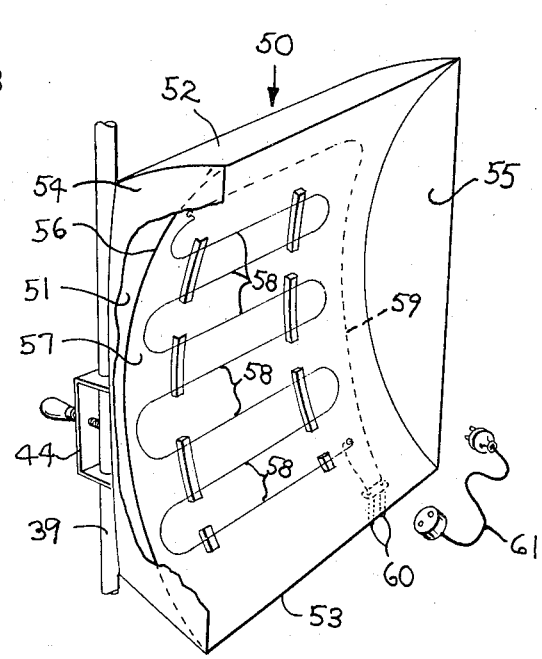
Figure 8:
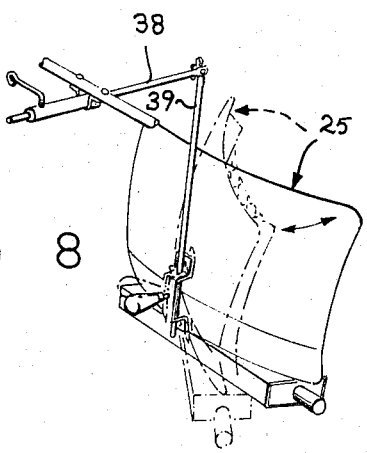
Figure 9:
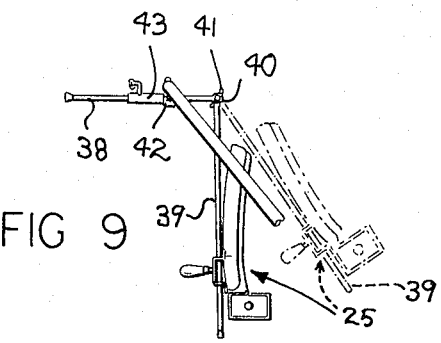

Other objects and advantages of the present invention, as well as the specific nature thereof, will become readily apparent to those skilled in the art to which the invention pertains upon the basis of the following detailed description taken in conjunction with the annnexed sheets of drawings on which, by way of example only, certain preferred embodiments of this invention are illustrated, and whereon:

FIG. 1 is a perspective view of one preferred form of the present invention and showing same embodied in a collapsible grill assembly; the grill assembly being depicted in an erected position; and FIG. 2 is an elevational view of one end of the grill assembly depicted in FIG. 1; and FIG. 3 is also an end elevational view of the grill assembly, but, by way of contrast, alternatively showing the grill assembly arranged in a collapsed or folded position; and FIG. 4 is a side elevational view of the grill assembly positioned in the manner depicted in FIGS. 1 and 2; and FIG. 5 is a sectional view taken along and viewed in the indicated direction of sectional plane 5—5 in FIG. 4; and FIG. 6 is a schematic perspective view of one of the grill assembly heating units and depicting, through the use of comparative solid and broken lines, vertically adjustable features of the grill heating units; and FIG. 7 is a view similar to FIG. 6, but, by comparison, depicting horizontally adjustable features of the grill heating units; and FIG. 8 is another view similar to FIG. 6, but, by comparison, depicting rotatably adjustable features of the grill heating units; and FIG. 9 is still another view similar to FIG. 6, but, by comparison, depicting pivotably adjustable features of the grill heating units; and FIG. 10 is a sectional view taken along and viewed in the direction of sectional plane 10—10 in FIG. 4; and FIG. 11 is a perspective view of the upper portion of the grill assembly and showing an alternative manner of arrangement of the grill assembly and components shown in FIG. 1; and FIG. 12 is a vertical sectional view of one of the grill heating units as viewed along and in the direction of sectional plane 12—12 in FIG. 7; and FIG. 13 is a sectional view taken along and in the direction of sectional plane 13—13 in FIG. 1; and FIG. 14 is a sectional view taken along and in the direction of sectional plane 14—14 in FIG. 1; and FIG. 15 is a fragmentary perspective view of another form of heating unit modified in accordance with the principles of the present invention.

The structure of the present invention is such that the grill assembly is alternatively arrangeable in either an erected or a collapsed position. As more clearly indicated in the erected ready-to-use or self-standing position shown in FIGS. 1 and 2, the grill assembly is composed in part of a collapsible frame structure which includes a pair of generally identical pivotally interconnected companion support members 17 and 18 which, when the grill is placed in erected position, individually define generally inverse U-shaped configurations. For purposes of lightweight and rigidity, the companion support members 17 and 18 are preferably tubular and each is formed with a pair of generally parallel leg segments. Thus, for example, support member 17 has parallel leg segments 17a and 17b and support member 18 has parallel leg segments 18a and 18b. As illustrated, each of the leg segments of each support member is medially and pivotally interconnected with one each of the leg segments of the other support member by a pivot pin 19 to thereby accommodate interconnected scissor-like pivotal movement of the support members between the erected grill position depicted in FIGS. 1 and 2 and an alternative collapsed or folded grill position depicted in FIG. 3. The latter position, of course, is a more compact structural arrangement and enhances the portability of the grill, as well as the storage thereof, during such times or occasions when the grill assembly is not being utilized for cooking or heating purposes.

Housing the medial segments of each pair of pivotally interconnected legs 17a, 18a and 17b, 18b, there is a separable tubular brace 20. The separable parts of the brace 20 are carried and held together about the legs by the pivot pin 19 which projects through opposite side walls of the brace and which is suitably threaded to receive a manually tightenable locking nut such as the internally threaded wing nut 21. The brace is preferably composed of mating half-sections, such as inner section 22 and outer section 23, which may be readily assembled and clamped together around the leg segments during initial assembly of the grill. As the leg segments are pivotally separated to effect erection of the grill, they move towards and, as in FIG. 5, bear against the opposite axial ends of the brace 20 so that the latter becomes wedged between the leg segments and imparts sturdy support to the leg segments as well as the entire erected grill assembly.

Also included as an essential part of the grill assembly are a pair of separate heating units 25, which, as illustrated, may be identical in structure and one each of which is individually supported, or carried, on the closed leg connecting end portion of one each of the support members 17 and 18. The construction and arrangement of each heating unit 25 is such as to impart exceptional versatility in the manner of use of the grill assembly; such versatility being in large part effected by the provision of various adjustment means having structural features which cooperatively function to accommodate selective and extremely versatile arrangement or deployment of each of the heating units in a great variety of operable positions. Such variability and selective versatility of positioning and adjustment of each heating unit is typically and comparatively represented by solid and broken lines in FIGS. 6, 7, 8 and 9. As indicated in FIG. 6, for example, each heating unit may be shifted in a vertical path to accommodate selective upward and downward adjustments thereof between exemplary alternative positions indicated respectively by solid and broken lines. Likewise, each heating unit, as similarly shown in FIG. 7 may be adjusted inwardly and outwardly in a horizontal path. Additionally, as similarly indicated in FIG. 8, each heating unit may be individually rotated about a central axis. Still further, each heating unit may be pivoted about a horizontal pivotal axis, as in FIG. 9. Moreover, each of the foregoing adjustments and relative positional changes of the heating units 25 may be performed either independently or in conjunction with any one or more of the other aforementioned adjustments or positional changes. Consequently, it is possible to achieve essentially universal adjustability and positional deployability of each of the heating units. Moreover, each or both of the heating units 25 may be quickly and easily rearranged and deployed in numerous selective positions particularly favorable or suitable for most any type of cookery or use desired and irrespective of the nature and character of the food which is to be heated, cooked or prepared thereon. Additionally, other structural features, to be subsequently described, impart further versatility to the grill assembly and function cooperatively with the various adjustment means to provide an outdoor-type of lightweight grill assembly which is especially well-adapted for obtaining closely controllable cooking perfection and which is capable of being utilized for most any conventional manner of food preparation desired.

One conventional mode of food preparation, among others, accommodated by the grill assembly of the present invention is that of skewering or spit-roasting. Customarily, spit-roasting is a particularly desirable manner with which to prepare a roast or other relatively large meat item or to cook a whole chicken, or the like. Accommodation of spit-roasting is provided by the grill assembly of the present invention by a series of vertically spaced rotatable spits 26. The spits 26 are supported for individual rotational movements upon upright spit supporting arms 27 and 28 arranged at substantially opposite respective ends of the grill and provided with a series of vertically spaced openings which may take the form of slots 27a in one of the arms and transverse apertures 28a in the other of the arms and in which to gravitationally receive and support opposite respective ends of each of the spits 26. Each of the spit supporting arms are, as best shown in reference to supporting arm 27 in FIG. 10, welded or otherwise centrally secured in upright position to the inner section 22 of the separable tubular brace 20. Preferably, the spit supporting arms 27 and 28 are arranged so that they provide a spit bed between the spit supporting arms which is disposed in substantially parallel overhead alignment with the central pivotal axis of the pivotally interconnected grill support members 17 and 18. Intermediate the spit supporting arms 27 and 28 and disposed in underlying vertical alignment with the spit bed, there is a trough-like drip-pan 29 in which to receive juice, grease and drippings which may be dispelled from the food and gravitate downward during cooking. The drip-pan 29 is gravitationally supported at its opposite respective longitudinal ends in U-shaped brackets 30 (FIG. 10) secured respectively to the inner section 22 of the separable collar brace 20.

The grill assembly also includes a horizontally supportable grill rack which is ordinarily more preferable for frying, cooking or broiling hamburg patties, steaks, chops, etc., and other similar food items more suitably accommodated upon a horizontally disposed cooking surface than en brochette. When such use of the grill rack 30 is desired, it may be, as shown in FIG. 11, positioned horizontally across the space intermediate the closed ends of the erected U-shaped support members 17 and 18 and removably seated and held in place on the support members 17 and 18 by suitable clips or the like, such as spring clips 31, secured at spaced locations along and projecting upwardly from the closed ends of the support members.

During periods of nonuse, storage or transportation of the grill assembly, the spits 26 and/or the grill rack 30 may be conveniently secured in out-of-the-way storage locations, as in FIG. 3, provided by additional spring clip fasteners 31a affixed on the lower portions of the support member leg segments 17a, 17b, 18a and 18b. For example, as in FIG. 1, the grill rack 30 may be removably clipped in place on and between leg segments 18a and 18b, and the spits 26 may be similarly removably clipped on and between leg segments 17a and 17b.

The construction of the heating units 25 is such that each functions to provide an individual heating chamber in which to confine and burn a combustible material or substance, such as charcoal, wood chips or other like combustible material, suitable for providing a source of heat for cooking purposes. As best observed in FIG. 12, each heating unit 25 is comprised in part by an imperforate back section 32 preferably fabricated from a lightweight heat resistant material, such as lightweight sheet metal, and a reticulate front or screen section 33; the latter being arranged in spaced, generally parallel relationship with the back section 32 to define therebetween a generally rectangular pocket or fuel chamber in which to accommodate and retain a suitable combustible substance, such as charcoal briquettes or other similar combustible heating material commonly employed in outdoor grills. The screen section 33 is constructed from a wire mesh fabric or similar substantially perforate or reticulate material, such as expanded metal, metal grating, or the like, which is of sufficient mesh size that it does not greatly impede the passage of heat, and particularly radiant heat, therethrough. Of course, the screen section should also be fabricated from a material which is capable of withstanding the heat of the burning fuel as well as the corrosive weathering effects to which outdoor grills of the type herein contemplated are ordinarily exposed. Side enclosures for enclosing opposite sides of the fuel chamber, e.g., the space between the front and back sections 32 and 33, may be provided by imperforate metal side ribs, or spacing ribs 34, which, as shown, are secured along opposite marginal edges of the interior wall side 35 of the back section 32 of each heating unit and are interconnected with and serve to space the screen section 33 from the back section. Alternatively, instead of employing separately formed spacing ribs, it should be readily apparent that the screen section 33, although not shown as such, may be formed along opposite sides with inwardly bent marginal edges which may be fastened to the back section 32 to enclose the opposite sides of the fuel chamber.

Stretched across the lower or bottom end of the fuel chamber, a perforate grate is provided which accommodates disposal of ashes, carbonaceous residue, and the like, such as occur and would otherwise tend to accumulate within the fuel chamber during the combustion of the heating fuel. Although the grate may be a separate reticulate plate or screen section, it is preferred to merely utilize the reticulate screen section 33 for this purpose by providing the same with an inwardly bent lower end portion 36 adapted to project across the bottom of the fuel chamber and which may be retained in position by being suitably secured to the back section 32 and/or the spacing ribs 34. Thus, as the fuel burns and distintegrates, such ashes and carbonaceous residue as result therefrom tend to gravitate downward and precipitate through the grate 36 into suitable means of disposal hereinafter described.

Along the bottom of each of the heating units 25, and disposed directly beneath the grate 36, means are provided within which to catch and trap the ashes and other solid residue precipitating downward through the grate 36. To this end, an elongated, open-ended channel 37 is formed integrally with or otherwise secured to the bottom of each heating unit 25 and disposed in underlying and coextensive relationship with the grate 36. Axially and slidably received within each channel 37, there is a removable ash drawer 48 in which to receive ashes and other residue precipitating downwardly through the reticulate grate 36. Whenever desired, either during or after use of the grill assembly, the ash drawer 48 may be temporarily slidably removed from the channel 37 and emptied. Thus, the hazard of wind-blown or airborne ashes providing a source of contamination of the food being prepared on the grill is minimized. Furthermore, an improved overall heating efficiency is derived from the heating units. Moreover, the normally disagreeable and time-consuming chore attending separation, removal and handling of such ashes or combustion products in conventional grill assemblies is minimized to an extent that it is no longer a matter of appreciable concern.

The interior wall side 35 of the back section 32 possesses or is otherwise provided with a reflective heat-resistant surface finish or coating. Such finish or coating functions to redirect a considerable amount of otherwise nonuseful radiant heat rays into effective cooking heat by reflectively redirecting such rays of radiant heat into a path disposed outward through the reticulate front or screen section 33 of each heating unit 25 and towards the cooking region of the grill assembly. The heating effectiveness is further implemented by the configuration of the interior wall side 35 which is shaped to define a concave surface configuration. Such configuration in cooperation with the reflective surface finish or coating serves to focus and concentrate substantially all of the reflected radiant heat rays into a convergent path which, by selective orientation of the heating units 25, may be selectively focused towards the food being prepared or heated in the cooking region of the grill. Thus, the proximity from which heat is being applied to the cooking region of the grill, as well as the location of selective concentration of the heat, can be readily controlled and/or varied by simple directional readjustment of the heating units 25 relative to the cooking region.

The directional variability and overall selective orientability of each of the heating units 25 is effected by the provision of interrelated means of adjustment which are cooperatively arranged to permit extensive rearrangement, spacing and deployment of each of the heating units. Consequently, the heaing units may be extensively adjusted in relation to the item or items of food being cooked to thereby accomplish extensive controllable variations and changes in direction, location and rate of heat application. The aforementioned interrelated means of adjustment may be and preferably are identical with respect to each heating unit and the description of such means will therefore be limited to the structural relationship thereof with one of the heating units rather than needlessly repeated with respect to both heating units. In accordance with the foregoing, each heating uniit 25 is adjustably supported by a first adjustable supporting arm 38 and a second adjustable supporting arm 39 mutually linked together at one axial end for relative end-to-end pivotal movement. As best depicted in FIG. 9, the endwise interlinkage between the first and second supporting arms 38 and 39, respectively, affords relative pivotal movement of the second supporting arm 39 about a horizontal axis at the location of interlinkage. Such pivotal interconnection, or interlinkage, includes a pivot pin 40 passing through axially aligned transverse pin openings provided in the ends of the supporting arms. To prevent accidental detachment, the pivot pin 40 may be suitably capped at one end and threaded at the other end to receive suitable tightening means, such as a wing nut 41.

The first supporting arm 38 for each heating unit 25 is adjustably interconnected with the frame structure by means of a first collar bracket 42, best observed in FIG.

13, in which there is retained, in fixed relationship to the frame structure, a tubular sleeve 43. The sleeve 43 is centrally secured in perpendicular relationship with the underside of one of the support members and slidably receives the first adjustable supporting arm 38 axially within the hollow central portion of the sleeve. The second adjustable supporting arm 39 is similarly journaled, or sleeved, within a second collar bracket 44 rigidly secured, or affixed, to the exterior side 45 of the heating unit back section 32. Manually releasable locking means are also provided for locking the adjustable supporting arms 38 and 39 in the selected adjusted position within their respective collar brackets 43 and 44. As best shown in FIGS. 13 and 14, such locking means may be a conventional type of manually releasable fastener of holder, such as threaded rods 46 and 47, threadably secured through the wall of each of the respective collar brackets 43 and 44 to bias against the supporting arms 38 and 39, respectively. As illustrated, the rods 46 and 47 are provided with a suitable handle so that they may be manually tightened or loosened to accommodate shifting the relative positions of the supporting arms within their respective collar brackets.

In the foregoing embodiment, the heating units 25 are particularly designed to accommodate charcoal, wood chips and similar combustible materials for the generation of the heat used in the cooking and heating of various food items on the grill assembly. By contrast, a modified form of the heating units is shown and represented by the electric heating unit 50. Like the heating units 25, the electric heating unit 50 is constructed with an imperforate back section 51 and an open front section. The upper and lower ends 52 and 53, respectively, of the heating unit project inwardly from the back section in the form of canopies and may be interconnected by side walls 54 and 55, respectively, extending along opposite sides of the heating unit and joined with the back section 51. Nested within the heating unit 50, there may be provided a heat reflector 56 having a forward disposed reflective surface 57 which may be the result of a mirror-like polished surface finish or the result of a reflective coating applied to the forwardly facing side of the heat reflector. The heat reflector 56 is interposed between the back section 51 and a plurality of heat-producing electric resistant coils 58 which may be fastened to the forwardly facing side of the heat reflector or otherwise secured in position within the heating unit in a location disposed forwardly of the reflective heat reflector surface 57. The electric resistance heating coils 58 lead through electrical connecting wires 59 to an electric lead-in connector 60 which is suitably adapted to interconnect with a conventional electric extension cord 61 which in turn may be connected to a suitable electric power source such as a conventional household electric outlet, not shown.

Irrespective of which of the foregoing embodiments are utilized, the grill assembly of the present invention may be readily collapsed or folded to facilitate transporting or storing of the grill. Moreover, the grill assembly is extremely versatile in that it may be used both for spit-roasting and for broiling.

The adjustability of the heating units is also extremely advantageous in that they may be arranged in numerous positions to obtain the most beneficial and desirable cooking or heating. When the heating units are arranged in a vertically depending position, they may be easily replenished with fuel without removing or disturbing the food being prepared on the grill. Similarly, residual ashes and the like may be removed without removing or disturbing the food being prepared. Furthermore, the off-set disposition of the heating units relative to the cooking region of the grill assembly permits the food to be prepared without occasioning objectionable flare-up caused by the ignition of grease, juices and drippings coming into contact with the burning fuel. Rather, such juices and drippings may be retrieved for basting or making gravy. Additionally, very little, if any, rotation of the spits is required during spit-roasting in order to obtain uniform cooking. By virtue of the utilization of a pair of heating units disposed in oppositely facing spaced relationship, the food items carried on one or more of the spits are simultaneously cooked on opposite sides.

Although the present invention and its various embodiments have been described in substantial detail in the foregoing description, it is not the purpose thereof to limit the invention to such details otherwise than may be necessitated by the scope of the appended claims. Having now described the invention in full detail,

I claim:
1. A portable and collapsible grill assembly comprising, in combination:
 a pair of oppositely facing inverted U-shaped support members each having a pair of generally parallel leg segments and an upper end interconnecting said pair of leg segments, one pair of said leg segments being medially and pivotally interconnected with the other pair of said leg segments to thereby accommodate relative scissor-like pivotal movement of said support members between alternative erected and collapsed positions, said support members in said erected position being pivotally deployed to attain oppositely disposed oblique upstanding positions and in said collapsed position being pivotally deployed to attain generally parallel relationship;
 a heating and cooking region defined intermediate the upper portions of said support members when deployed in said upstanding positions;
 food supporting means including a grilling rack, a spit, means for seating said grilling rack upon said upper ends of said support members in bridging relationship with said heating and cooking region and with said support members being arranged in erected position, means for supporting a spit across the heating and cooking region of said grill assembly in underlying relationship with the aforementioned seated position of said grilling rack, said last-mentioned means also being arranged to accommodate free removability and rotatability of said spit;
 a pair of heating units, each of said heating units comprising an imperforate back section of lightweight and heat-resistant material, an open front section arranged in spaced and generally parallel relationship with said back section, a reflective surface interposed between said back section and said front section, and a heating chamber defined between said reflective surface and said front section;
 adjustable means separately suspending one each of said heating units in depending relationship with said upper end of one each of said support members, said adjustable means comprising a pair of separately adjustable means, each of said pair of adjustable means including a first supporting arm and a second supporting arm pivotally interconnected with said first supporting arm and carrying one of said heating units in depending relationship with said first supporting arm, one each of said first supporting arms being slidably interconnected with one each of said upper ends of said support members to accommodate selective adjustable movements thereof together and as a unit with one of said second supporting arms and one of said heating units relative to said support members in a horizontal path leading alternatively towards and away from said heating and cooking region, said first and second supporting arms of each pair of adjustable means having a horizontal axis of pivotal interconnection disposed normal to said horizontal path of adjustable movement to thereby accommodate selective pivotally adjustable movement relative to said heating and cooking region of each of said second supporting arms together as a unit with one of said heating units, said second supporting arms including means for accom- modating axially slidable and rotatable adjustable movements of said heating units along the length of said second supporting arms, one each of said pair of adjustable means together with one of said heating units being arranged to travel with one each of said support members between said alternative erected and collapsed positions;

means for releasably locking each of said first supporting arms in alternative horizontally adjusted positions relative to said support members, means for releasably locking each of said heating units in alternative slidably and rotatably adjusted positions on said second supporting arms, and means for releasably locking each pair of pivotally interconnected first and second supporting arms in alternative pivotally adjusted positions.

2. The combination defined in claim 1, wherein each of said heating units further includes a reticulate screen of heat-resistant material arranged across said open front section in spaced and generally parallel relationship with said back section, said reticulate screen being interconnected with said back section along the opposite marginal sides and the bottom thereof and cooperating with said back section to define a fuel chamber in which to contain a combustible material, and wherein said back section possesses a reflective interior wall side facing said reticulate screen section and defining a concave surface configuration.

3. The combination defined in claim 1, wherein each of said heating units contains electrically operative heating means mounted between said reflective surface and said front section.

4. A grill assembly comprising the combination of:
a frame structure including oppositely disposed support members having lower portions upon which to support the grill assembly in a self-standing upright position and having oppositely facing portions arranged in mutually spaced relationship in conjunction with said self-standing position;
a heating and cooking region defined in the space intermediate the said support members;
food supporting means for supporting food in said heating and cooking region;
a heating unit for directing heat into said heating and cooking region;
adjustable means carrying and adjustably interconnecting said heating unit and said frame structure, said adjustable means accommodating independently selective upward and downward, inward and outward, rotatable and pivotal adjustments of said heating unit relative to said heating and cooking region;
said grill assembly thereby accommodating substantially universal selectively adjustable control of the proximity and direction of heat emitted from said heating unit in relation to food supported in the heating and cooking region thereof.

5. The combination defined in claim 4, wherein said food supporting means includes a spit, and spit supporting means for supporting said spit across the heating and cooking region of said grill assembly, said spit supporting means accommodating free removability and rotatability of said spit.

6. The combination defined in claim 5, including means provided on said lower portions of the support members for removably storing said spit on said frame structure when said spit is removed from said spit supporting means.

7. The combination defined in claim 4, wherein said food supporting means includes a grilling rack adapted to horizontally bridge said heating and cooking region and removably seat upon the erected oppositely facing spaced upper portions of said support members.

8. The combination defined in claim 7, including means provided on said lower portions of the support members for removably storing said grilling rack on the frame structure when said grilling rack is removably unseated from said upper portions of the support members.

9. The combination as defined in claim 4, wherein said food supporting means includes means for seating a grilling rack upon said oppositely facing spaced upper portions of the support members and horizontally bridging said heating and cooking region, and spit supporting means for supporting a spit across the heating and cooking region of said grill assembly, said spit supporting means being adapted to afford free removability and rotatability of said spit while the latter is supported by said spit supporting means.

10. The combination defined in claim 9, including means on said lower portions of the support members for removably storing said grilling rack and said spit in locations remote from said heating and cooking region.

11. The combination defined in claim 9, with said food supporting means being arranged to concurrently support said spit and said grilling rack in vertically spaced relationship.

12. The combination defined in claim 4, wherein said heating unit comprises an imperforate back section of lightweight and heat-resistant material, an open front section arranged in spaced relationship with said back section, reflective means interposed between said back section and said front section and arranged to reflect radiant heat away from said back section and towards said front section.

13. The combination defined in claim 12, including electrically operative heating means mounted between said reflective means and said front section.

14. The combination defined in claim 12, including a drip pan removably supported in underlying relationship with said food supporting means and adapted to receive and contain drippings gravitating downward from food supported on said food supporting means.

15. The combination defined in claim 4, wherein said heating unit comprises an imperforate back section of lightweight and heat-resistant material, a reticulate front section of heat-resistant material arranged in spaced and generally parallel relationship with said back section, said front section also being interconnected with said back section along opposite marginal sides thereof, and grating stretching across the bottom of the space between said front and back sections and cooperating therewith to define a fuel chamber in which to contain a combustible material.

16. The combination defined in claim 15, including an open top ash drawer removably mounted in underlying relationship with said grating and disposed to receive ashes gravitating through said grating from said fuel chamber.

17. The combination defined in claim 15, wherein said back section includes an interior wall side disposed in facing relationship with said front section, and wherein said interior wall side possesses a heat-reflective surface thereon.

18. The combination defined in claim 17, wherein said interior wall side of said back section also defines a concave surface configuration cooperating with said heat-reflective surface to focus radiant heat rays into a convergent path towards said front section.

19. A grill assembly comprising the combination of:
a frame structure including oppositely disposed support members having lower portions upon which to support the grill assembly in a self-standing upright position and having oppositely facing upper portions arranged in mutually spaced relationship in conjunction with said self-standing position;
a heating and cooking region afforded in the space intermediate the upper portions of said support members;
means for supporting food in said heating and cooking region and for exposing such food to the influence of cooking heat;

a pair of heating units for accommodating a heat-producing source of cooking heat and for directing such heat from said heat-producing source into said heating and cooking region;

adjustable means respectively suspending said pair of heating units from said frame structure and locating said heating units on opposite respective sides of said heating and cooking region, said adjustable means comprising a pair of adjustable means respectively including a first supporting arm and a second supporting arm, one each of said second supporting arms being interconnected with one each of said first supporting arms and carrying one each of said heating units in depending relationship with said first supporting arm;

each of said heating units being slidably and rotatably adjustable on its respective second supporting arm to thereby accommodate selectively adjustable movements of each of said heating units along the length of its respective second supporting arm towards and away from its respective first supporting arm, and to thereby also accommodate selectively adjustable rotative movements of each of said heating units relative to its respective second supporting arm;

said grill assembly thereby accommodating selectively adjustable control of the proximity and direction of heat emitted from said heat-producing source relative to said heating and cooking region.

20. The combination defined in claim 19, with said first and second supporting arms of each of said pair of adjustable means being pivotally interconnected and having a horizontal axis of pivotal interconnection disposed normally to said horizontal path of adjustable movement to accommodate selective pivotally adjustable movement of each of said second supporting arms together with one each of said heating units relative to said heating and cooking region.

21. The combination defined in claim 20, including means for releasably locking each of said first supporting arms in horizontally adjusted alternative positions relative to said frame structure, means for releasably locking each of said heating units in alternative slidably and rotatably adjusted positions with one each of said second supporting arms, and means for releasably locking each of said pivotally interconnected first and second supporting arms in alternative pivotally adjusted positions.

22. The combination defined in claim 4, including a second heating unit arranged in interspaced paired relationship with the first-mentioned heating unit, a supporting arm carrying and adjustably interconnecting said second heating unit with said frame structure at a location on the opposite side of said heating and cooking region from said first-mentioned heating unit and having means for accommodating selectively adjustable rotative movements of said second heating unit relative to its respective supporting arm, to thereby provide independent selective adjustment of the proximity and direction of heat emitted from each of said heating units in cooperative relationship to the heating and cooking region of the grill assembly.

23. The combination defined in claim 4, including means pivotally interconnecting said heating unit with said frame structure for selectively adjustable pivotal movements of said heating unit relative to said heating and cooking region.

24. The combination defined in claim 4, with said heating unit being slidably adjustable on said supporting arm to thereby additionally accommodate slidable adjustable movements of said heating unit along the length of said supporting arm and relative to said heating and cooking region.

25. The combination defined in claim 4, with said heating unit being interconnected with said frame structure through one of said support members, said heating unit being paired with an additional heating unit interconnected with said frame through an oppositely disposed support member and cooperating with the first-mentioned heating unit to direct heat into said heating and cooking region from opposite sides of said grill assembly, adjustable means carrying and adjustably interconnecting said additional heating unit with its respective support member to accommodate selective upward and downward, inward and outward, rotatable and pivotal adjustments of said additional heating unit relative to said heating and cooking region, said grill assembly thereby accommodating substantially universal selectively adjustable control of the proximity and direction of heat emitted from each of said heating units in relation to food supported in the heating and cooking region thereof.

26. The combination defined in claim 4, wherein said support members have oppositely facing upper portions arranged in mutually spaced relationship in conjunction with said self-standing position and wherein said heating and cooking region is defined in the space intermediate said upper portions of said support members.

References Cited

UNITED STATES PATENTS

| | | | |
|---|---|---|---|
| 1,656,181 | 1/1928 | Elbert | 99—390 X |
| 2,335,217 | 11/1943 | Tate | 126—14 |
| 2,573,988 | 11/1951 | Saltzberg | 99—340 |
| 2,900,482 | 8/1959 | Aylor. | |
| 2,943,557 | 7/1960 | Suehlsen | 99—421 |
| 2,995,315 | 8/1961 | Bussing | 126—9 |
| 3,008,405 | 11/1961 | Boyer | 99—390 X |
| 3,018,772 | 1/1962 | Blazey | 99—340 |
| 3,052,177 | 9/1962 | Lombardo | 99—390 |
| 3,182,585 | 5/1965 | Rensch et al. | 99—340 |
| 3,230,948 | 1/1966 | Schmitt | 99—340 X |
| 3,244,859 | 4/1966 | Whiteford | 99—390 X |

FOREIGN PATENTS

| | | |
|---|---|---|
| 231,482 | 6/1959 | Australia. |

WALTER A. SCHEEL, *Primary Examiner.*

A. O. HENDERSON, *Assistant Examiner.*